United States Patent
Park

(10) Patent No.: US 9,135,060 B2
(45) Date of Patent: Sep. 15, 2015

(54) METHOD AND APPARATUS FOR MIGRATING TASK IN MULTICORE PLATFORM

(75) Inventor: Jung-keun Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1854 days.

(21) Appl. No.: 12/216,996

(22) Filed: Jul. 14, 2008

(65) Prior Publication Data

US 2009/0165014 A1     Jun. 25, 2009

(30) Foreign Application Priority Data

Dec. 20, 2007  (KR) .................. 10-2007-0134452

(51) Int. Cl.
| | | |
|---|---|---|
| G06F 7/38 | (2006.01) | |
| G06F 9/00 | (2006.01) | |
| G06F 9/44 | (2006.01) | |
| G06F 15/00 | (2006.01) | |
| G06F 9/48 | (2006.01) | |
| G06F 9/50 | (2006.01) | |

(52) U.S. Cl.
CPC ............ G06F 9/4856 (2013.01); G06F 9/5088 (2013.01)

(58) Field of Classification Search
None
See application file for complete search history.

(56) References Cited

U.S. PATENT DOCUMENTS

| | | |
|---|---|---|
| 7,482,572 B1 | 1/2009 | Galvin |
| 2005/0288372 A1 | 12/2005 | Ron |
| 2006/0179436 A1 | 8/2006 | Yasue |
| 2008/0244226 A1* | 10/2008 | Li et al. ........................ 712/30 |

FOREIGN PATENT DOCUMENTS

| | | |
|---|---|---|
| JP | 2001-067331 | 3/2001 |
| JP | 2003-271404 | 9/2003 |
| KR | 10-2006-0132852 | 12/2006 |

OTHER PUBLICATIONS

Seznec et al.; Performance Implications of Single Thread Migration on a Chip Multi-Core; Nov. 2005; ACM SIGARCH Computer Architecture News, vol. 33 Issue 4, Nov. 2005.*
Heo et al.; Reducing Power Density through Activity Migration; Aug. 2003; ISLPED '03.*
Ellard T. Roush et al., "Fast Dynamic Process Migration", Proceedings of the 16$^{th}$ICDCS, 1996, pp. 637-645.

* cited by examiner

*Primary Examiner* — Corey S Faherty
(74) *Attorney, Agent, or Firm* — NSIP Law

(57) ABSTRACT

Provided are a method and apparatus for migrating a task in a multi-core platform including a plurality of cores. The method includes transmitting codes of the task that is being performed in a first core among the plurality of cores to a second core among the plurality of cores, the transmitting of the codes being performed while performing the task at the first core, and resuming performing of the task in the second core based on the transmitted codes.

15 Claims, 8 Drawing Sheets

| ID | | STATE | CORE | MIGRATION |
|---|---|---|---|---|
| 1 | | MIGRATING | 1 | 2 |
| 2 | | RUNNING | 3 | |
| ... | | | | |

METHOD AND APPARATUS FOR MIGRATING TASK IN MULTICORE PLATFORM

CROSS-REFERENCE TO RELATED APPLICATIONS

This application claims the benefit of Korean Patent Application No. 10-2007-0134452, filed on Dec. 20, 2007, in the Korean Intellectual Property Office, the disclosure of which is incorporated herein in its entirety by reference.

BACKGROUND

1. Field

One or more embodiments of the present invention relate to an operating system for driving an embedded system such as in a mobile device, a multimedia device, a home device, and the like, and more particularly, to a method and apparatus for migrating at least one task so that the task can be performed in a suitable core in an operating system for driving a computer system such as a computer, a notebook, and the like that contains a multi-core.

2. Description of the Related Art

Multi-core platforms have become important due to the performance limitation of single cores in processor technology that has developed through performance/speed competition of cores. Furthermore, it is expected that development will be from multi-core platforms to many-core platforms that use several tens or hundreds of cores.

An operating system assigns each task that is to be performed to each core and schedules each task according to a priority of each task in order to perform multi-tasking in a current multi-core platform. In this regard, a static method and a dynamic method are used to determine in which one of a plurality of cores each task is to be performed and to assign each task to a corresponding core.

In a static method, a core in which a task is to be performed is static and does not change. In more detail, if a task is initially assigned to a core, the core performs the task until it is completed. In a dynamic method, a task migrates to several cores while being performed according to the load of a system or a change in the constitution of an application thereof. In more detail, even if a task is initially assigned to a predetermined core, the task can be performed in another core according to a next situation.

As described above, the static method is used for simple scheduling due to the non-migration of a task, whereas it is not used to actively change a plurality of cores, which reduces utilization of each core and does not cope with dynamic environmental variation. A flexible system is needed to meet a user's various requirements. To this end, a method of dynamically coping with the load of the flexible system or a change in the constitution of an application thereof is required to perform tasks.

However, a task must migrate from an initially assigned predetermined core to another core in order to dynamically change an assignment of the task. In this regard, it is very important to reduce migration costs of resources. In particular, an embedded system that performs a real-time task such as a multimedia task must continue to provide a service in spite of migration of the task.

SUMMARY

One or more embodiments of the present invention provide a method and apparatus for migrating a task from one core to another core without stopping the task in a multi-core platform. Embodiments of the present invention also provide a computer readable recording medium on which the method is recorded.

Additional aspects and/or advantages will be set forth in part in the description which follows and, in part, will be apparent from the description, or may be learned by practice of the invention.

To achieve the above and/or other aspects and advantages, one or more embodiments of the present invention may include a method of migrating a task in a multi-core platform including a plurality of cores, the method including transmitting codes of the task being performed in a first core, among the plurality of cores, to a second core among the plurality of cores, the transmitting of the codes being performed while performing the task in the first core, and resuming performing of the task in the second core based on the transmitted codes.

To achieve the above and/or other aspects and advantages, one or more embodiments of the present invention may include a computer readable recording medium storing a program for executing a method of migrating a task in a multi-core platform including a plurality of cores, the method including transmitting codes of the task being performed in a first core, among the plurality of cores, to a second core among the plurality of cores, the transmitting of the codes being performed while performing the task in the first core, and resuming performing of the task in the second core based on the transmitted codes.

To achieve the above and/or other aspects and advantages, one or more embodiments of the present invention may include an apparatus for migrating a task in a multi-core platform including a plurality of cores, the apparatus including a first core transmitting codes of the task that is being performed while the task is being performed; and a second core resuming the performing of the task based on the transmitted codes.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Figure 1:
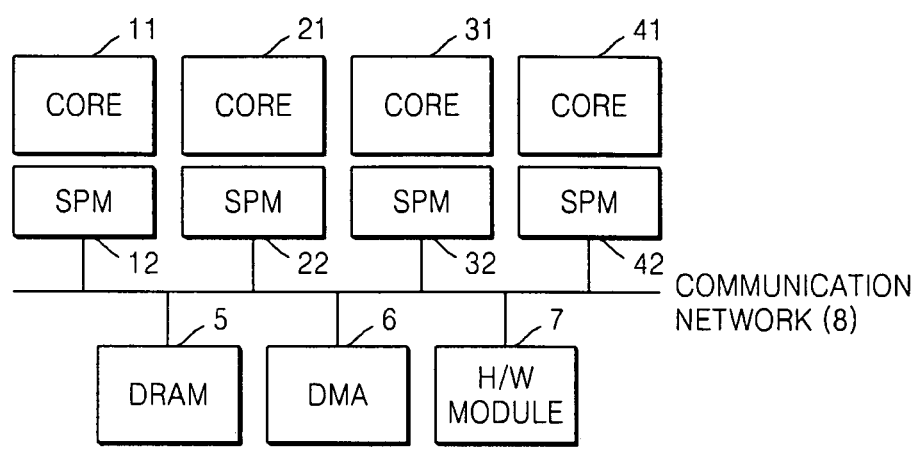
FIG. 1 illustrates the structure of a multi-core/many-core platform according to an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

An operating system assigns each of the tasks that are to be performed to each core and schedules each task according to priorities of tasks in order to perform multi-tasking in a current multi-core platform. In this regard, a static method and a dynamic method are used to determine in which one of a plurality of cores each task is to be performed and to assign each task to a corresponding core. Task migration in a multi-core system will now be described in more detail.

To migrate a task between cores, the status information of the task that is being performed must be allowed to migrate from a previous core to a next core. Such status information includes information on a register file of the core used by the task and on a memory used by the task. Generally, a multi-core platform uses a local memory such as a scratchpad memory (SPM) in addition to a cache for respective cores. Since the SPM does not maintain consistency with the hardware like the cache does, an application program or an operating system must obtain necessary data through software from a dynamic random access memory (DRAM) or other type of memory. Since the SPM occupies several hundreds of kilobytes according to the constitution of hardware, it is important to reduce costs incurred due to migration of the content of memory.

Conventional total copy, pre-copy, and demand page methods are used to allow the content of the memory to migrate. The total copy method temporally stops performing of a task, migrates all information including the content of a local memory, and resumes performing of the task in a new core. Meanwhile, the pre-copy method simultaneously allows a task to be performed and migrates the content of a local memory until a page correction of the local memory is reduced below a predetermined level, stops performing of the task, and continues to migrate the content of the local memory. The demand page method migrates a task by demand-paging a virtual memory, and copies necessary content of a memory whenever a page fault occurs.

Such conventional migration of the content of a memory is used to quickly migrate a task in a distribution system. In addition, a conventional method is to reduce time incurred to stop a task due to the loading of data of the task by previously loading the data of the task that is to be performed according to a schedule in a multi-core platform.

The total copy, pre-copy, and demand page methods are used in the distribution system that does not generally require real-time performance, and are not suitable for the multi-core platform. In particular, the total copy method stops performing the task while copying the entire content of the local memory used by the task. Furthermore, the pre-copy method may repeat copying of the same content of the local memory, which increases an overhead caused by the copying of the memory. In particular, the multi-core platform repeatedly stores data of a task in an input buffer of the local memory, processes the data, stores the data in an output buffer, causing an unnecessary migration of the data due to the copying of the entire content of the memory without considering the data. Furthermore, the demand-page method needs virtual memory hardware, however, an embedded system does not provide this and thus it is difficult to use the demand-page method.

Meanwhile, the method of previously loading data of a task that is to be performed according to a schedule of a multi-core platform is used to enhance performance by overlapping the time of loading a new task and the time of performing a previous task, which differs from a method of migrating a task without stopping the task.

FIG. 1 illustrates the structure of a multi-core/many-core platform according to an embodiment of the present invention. Referring to FIG. 1, the multi-core/many-core platform of the present embodiment comprises a first core 11, a first scratchpad memory (SPM) 12, a second core 21, a second SPM 22, a third core 31, a third SPM 32, an $N^{th}$ core 41, an $N^{th}$ SPM 42, a DRAM 5, a direct memory access (DMA) 6, a hardware (HNV) module 7, and a communication network 8. Each core performs a specific task. In an embodiment of the present invention, the first through $N^{th}$ cores 11 through 41 may be homogeneous cores, and heterogeneous cores such as a central processing unit (CPU), a digital signal processor (DSP), a reconfigurable processor (RP), etc.

Each core includes a local memory such as an SPM and stores codes and data necessary for performing a task. Each core copies codes and data of the task of the DRAM 5 in the local memory and performs the task based on the codes and data. Each core can more quickly access the local memory than the DRAM 5, thereby quickly performing the task. To migrate the task from a core to another core, a current performance status of the task including the content of the local memory must be migrated to a new core. The H/W module 7 supports a particular function of the multi-core/many-core platform. If the multi-core/many-core platform is a video reproduction apparatus, the H/W module 7 may be a video codec module. The communication network 8 connects the above elements of the multi-core/many-core platform and can be realized as a bus.

Figure 2:
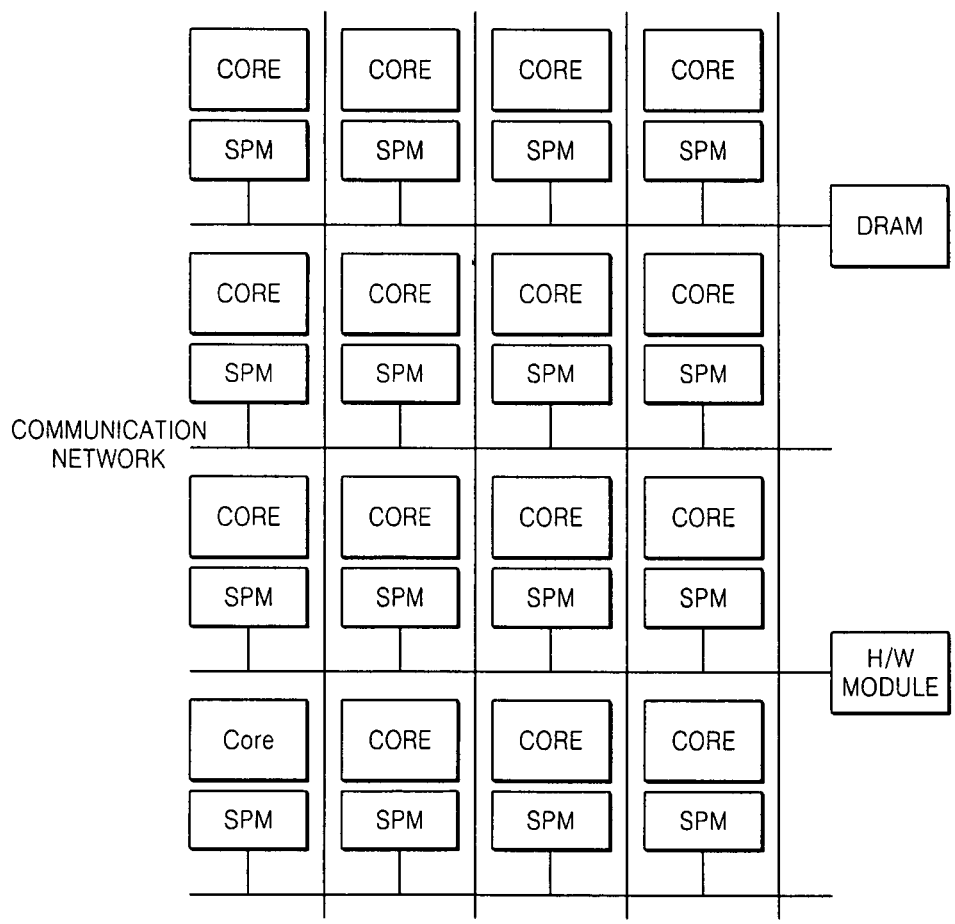
FIG. 2 illustrates cores of the multi-core/many-core platform shown in FIG. 1 that are mesh-connected.

FIG. 2 illustrates the cores of the multi-core/many-core platform shown in FIG. 1 that are mesh-connected. The cores of the multi-core/many-core platform can have a variety of connection types, in addition to the mesh-connected cores. Referring to FIG. 2, a communication speed between the cores differs according to connection types of the cores. In more detail, communication between cores that are located close to each other is faster than that between cores that are located far from each other. Thus, an arrangement of tasks in each core differs according to the amount of communication between tasks. In this regard, the arrangement of tasks influences performance of a system according to the load of the system or a combination of applications. In order to configure the system so as to have optimum performance, the arrangement of tasks must vary according to the arrangement of cores.

Figure 3:
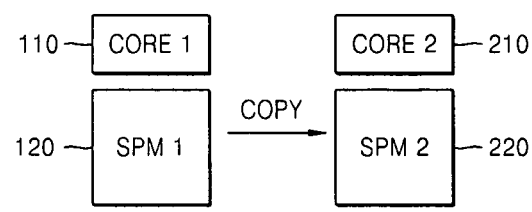
FIGS. 3 and 4 illustrate general migration of tasks in a multi-core system.
Figure 4:
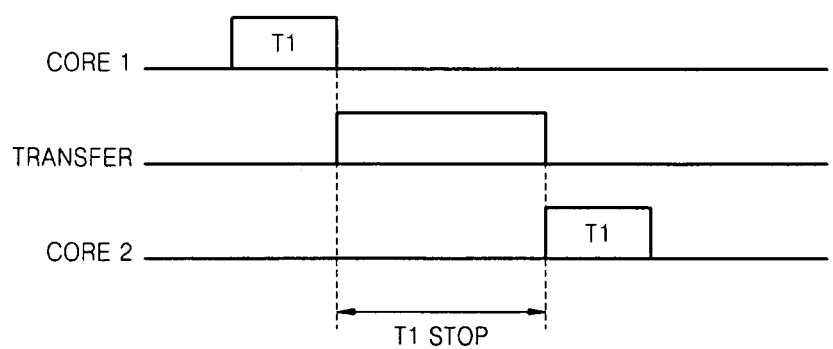

FIGS. 3 and 4 illustrate general migration of tasks in a multi-core system. Referring to FIGS. 3 and 4, to generally migrate a task from a first core 110 to a second core 210, the first core 110 stops performing the task, sends information on a current performance status of the task including the content of the local memory 120 to the second core 210, and resumes performing the task in the second core 210. The amount of local memory 120 is several hundreds of kilobytes, which results in a discontinuous performing of the task while the content of the local memory 120 migrates.

Figure 5:
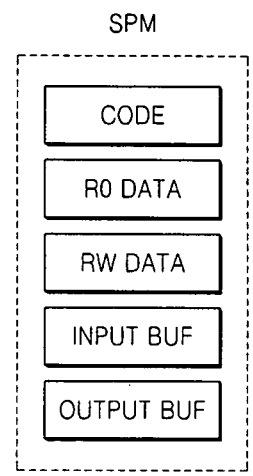
FIG. 5 illustrates the structure of a local memory according to an embodiment of the present invention.

FIG. 5 illustrates the structure of a local memory according to an embodiment of the present invention. Although a task may entirely use a local memory in an embodiment, a plurality of tasks can use a local memory. Referring to FIG. 5, the local memory used by the task comprises an area storing codes of tasks, an area storing read only data, an area storing read write data, an input buffer, and an output buffer. These areas correspond to logical maps of the local memory.

The task is a set of instructions. Codes of the task indicate the set of instructions. The read only data of the task is data that is not changed by performing the task, from among the data necessary for performing the task in a core. The read write data of the task is data that is changed by performing the task, from among the data necessary for performing the task using the core. The input buffer stores input data regarding the task. The output buffer processes the data stored in the input buffer according to the performing of the task and stores the processed result.

With regard to the operation of performing the task relating to the local memory, the core reads data necessary for performing the task from the input buffer, processes the data, and stores the processed result in the output buffer. A task status change is stored in the local memory in the form of read write data. Values of codes and the read only data of the task do not change according to the performing of the task, so that the codes and the read only data can migrate from a core to another core irrespective of whether the task is performed. The data stored in the input buffer and the output buffer can be accessed by a core that currently processes the data. Likewise, data having the same property is continuously collected in order to migrate the data stored in the local memory according to the property of the data. However, it will be understood by those of ordinary skill in the art that data does not have to be continuously collected.

Figure 6:
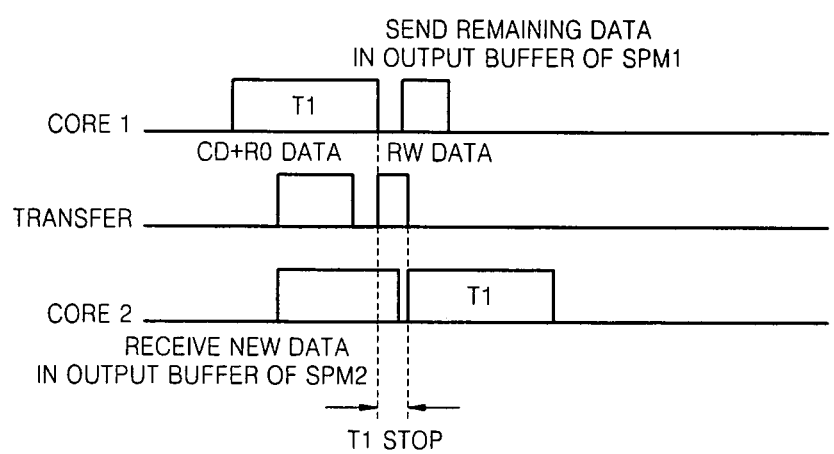
FIG. 6 illustrates migration of a task in a multi-core system according to an embodiment of the present invention.

FIG. 6 illustrates migration of a task in a multi-core system according to an embodiment of the present invention. Referring to FIG. 6, the codes and the read only data that do not change according to the performing of the task migrate while the task is being performed. The task is temporarily stopped only when read write data that changes according to the performing of the task migrates in order to reduce a section where the task stops. In this regard, it is established that input data that is to be processed according to the performing of the task is transferred to a local memory of a new core, whereas a current core processes remaining input and output data. Thus, the current core and the new core simultaneously perform the task temporarily while the task migrates. If the input and output data remaining in the current core is completely finished, the task completely migrates and the local memory of the current core used by the task can be used by another task.

The operation of the multi-core system may be described by applying the multi-core system illustrated in FIG. 6 to the multi-core/many-core platform shown in FIG. 1, for example. It is assumed that the task migrates from the first core 11 to the second core 21. The first core 11 transmits codes and read only data of the task that is currently being performed to the second core 21 and simultaneously processes data that is previously input with respect to the task based on codes, read only data, and read write data of the task so as to perform the task. The first core 11 stops performing the task if the first core 11 completely processes the data that is previously input with respect to the task, and transmits read write data of tasks to the second core 21. The second core 21 processes data that is to be input with respect to the task based on the codes, the read only data, and the read write data transmitted from the first core 11 and resumes performing the task.

Figures 7, 8:
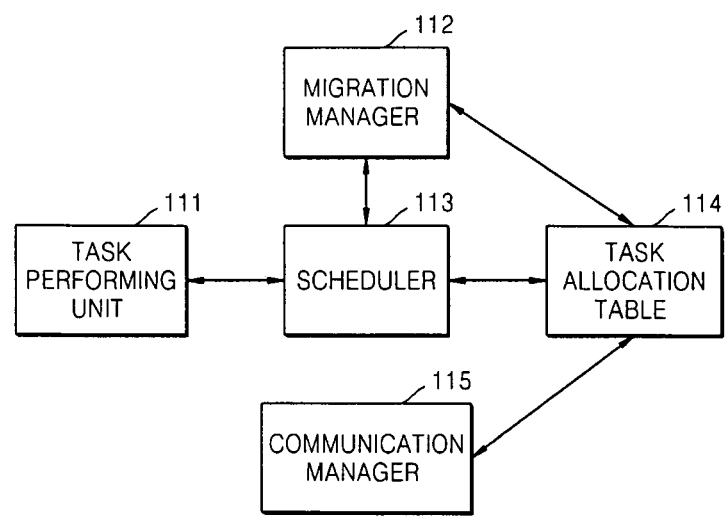
FIG. 7 is a block diagram of a core of a multi-core system according to an embodiment of the present invention.
FIG. 8 is a diagram of a structure of a task allocation table, for example, for a task allocation table as shown in FIG. 7.

FIG. 7 is a block diagram of a core of a multi-core system according to an embodiment of the present invention. Although the core further illustrated in FIG. 7 may be the first core 11 among the cores shown in FIG. 1, the other cores may also be applied. Referring to FIGS. 1 and 7, the first core 11 may comprise a task performing unit 111, a migration manager 112, a scheduler 113, a task allocation table 114, and a communication manager 115. In order to avoid the first core 11 from being overly complex, it will be understood by one of ordinary skill in the art that other elements can be included in the first core 11.

The task performing unit 111 performs a task. The scheduler 113 determines which cores are used to migrate the task according to the load of each core or the constitution of an application. If the first core 11 has a greater load than that of the second core 21, the scheduler 113 determines the second core 21 as a subject for processing the data that is to be input with respect to the task that is currently performed by the task performing unit 111. The migration manager 112 updates the task allocation table 114 indicating each core allocated as a subject for processing each task according to the determination of the scheduler 113. The communication manager 115 determines a core to which the data relating to the task is transmitted based on the task allocation table 114 updated by the migration manager 112. For example, the communication manager 115 transmits the codes and the read only data of the task to the second core 21 based on the task allocation table 114 which is updated by the migration manager 112.

FIG. 8 is a diagram of a structure of a task allocation table according to an embodiment of the present invention, for example, of the task allocation table 114 shown in FIG. 7. Referring to FIGS. 1, 7 and 8, the task allocation table 114 comprises an ID field recording an ID of a task, a state field recording a current task status, a core field recording an ID of a core allocated to a task, and a migration field recording an ID of a core to which a task is to migrate. The task allocation table 114 can also include another field recording other information, in addition to the above described fields.

If the second core 21 is determined as a subject for processing data that is to be input with respect to the task by the scheduler 113, the migration manager 112 changes the value of the state field from a running status to a migrating status, and records an ID of a core to which the task is to migrate in the migration field. If the value of the state field of the task having an ID is in the migrating status based on the task allocation table 114, the communication manager 115 transmits the data that is to be input with respect to the task to a core having the ID recorded in the migration field. If the task completely migrates, i.e., an input buffer of the first SPM 12 connected to the first core 11 is empty, the migration manager 112 changes a value of the core field to an ID of the core to which the task migrates, and changes the value of the state field to a value of a previous status.

Figure 9:
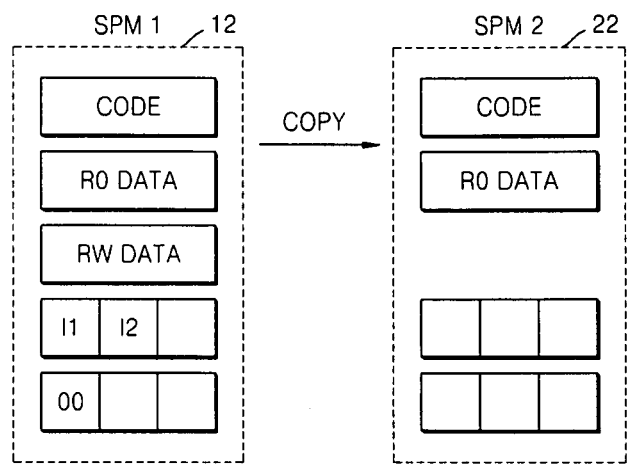
FIGS. 9 through 12 illustrate sequential status variations of a location memory of a multi-core system according to an embodiment of the present invention.

FIGS. 9 through 12 illustrate sequential status variations of a location memory of a multi-core system according to an embodiment of the present invention. Referring to FIGS. 1 and 9, if it is determined that a task migrates to the second core 21, the first core 11 transmits codes and read only data of the task stored in the first SPM 12 connected to the first core 11 to the second SPM 22 connected to the second core 21. In particular, the first core 11 may transmit the codes and the read only data of the task through the DMA 6 while performing the task. A core in which the task is currently performed and a core in which the task is to migrate should be homogeneous to each other. In homogeneous or instruction-compatible cores, codes that are being used at a current core are copied and the codes are used in a new core, whereas in heterogeneous cores, a new core loads codes from the DRAM 5 and changes the codes to comply with an environment in which the codes are executed in the new core.

Figure 10:
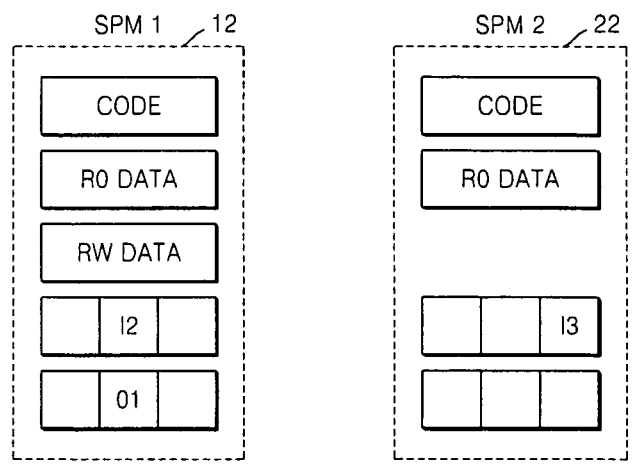

Referring to FIGS. 1 and 10, new data that is input into an input buffer of a current core is transmitted to a new core. Data that is previously input with regard to a task is stored in an input buffer of the first SPM 12 connected to the first core 11. If it is determined that the task migrates to the second core 21, the first core 11 establishes a location for storing data that is to be input with respect to the task as an input buffer of the second SPM 22 connected to the second core 21, so that the data that is to be input with respect to the task is transmitted to the second core 21 and is processed in the second core 21. The second core 21 processes the data stored in the input buffer of the second SPM 22 connected to the second core 21 and resumes performing the task. Referring to FIGS. 1, 9 and 10, if the task migration is determined where I1 and I2 are queuing in an input buffer of the first SPM 12 connected to the first core 11, I3 and next data are then stored in the input buffer of the second SPM 22 connected to the second core 21.

Figure 11:
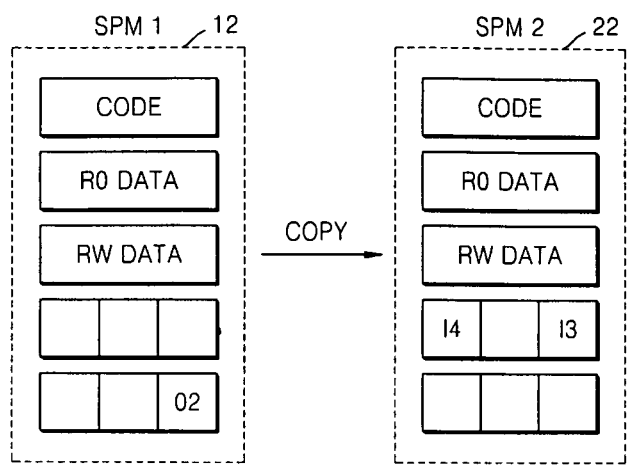

Referring to FIGS. 1 and 11, a task is temporarily stopped after data that is queuing in an input buffer of a current core is completely processed and read write data including a current status of the task is transmitted to a new core. If data that is previously input with respect to the task is completely processed, i.e., if an input buffer of the first SPM 12 connected to the first core 11 is empty, the first core 11 stops performing the task and transmits read write data stored in the first SPM 12 to the second SPM 22 connected to the second core 21. During this process, data that is newly input with respect to the task is continuously stored in the input buffer of the second SPM 22 connected to the second core 21. Here, I4 is continuously queuing in the input buffer of the second SPM 22 while the read write data migrates.

Figure 12:
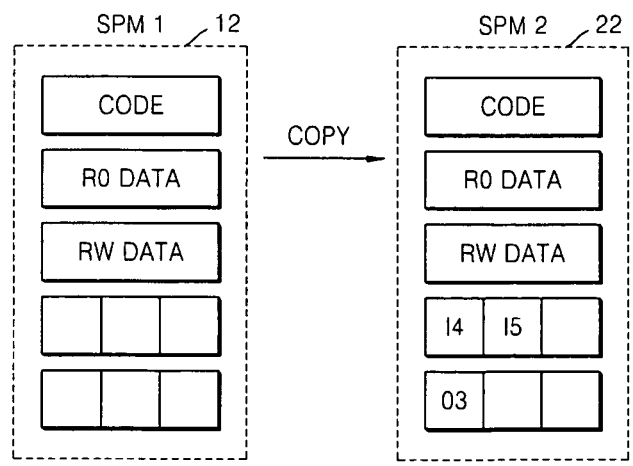

Referring to FIGS. 1, 11 and 12, a current core continuously transmits previously processed output data to the DRAM 5 or to another core, whereas a new core processes new data. The first core 11 outputs O2 of an output buffer of the first SPM 12 connected to the first core 11. The second core 21 processes I3 of the input buffer of the second SPM 22 connected to the second core 21. Thus, O3 is generated. If input and output buffers of the first core 11 are empty, the task completely migrates. A new task uses the first SPM 12 connected to the first core 11.

Figure 13:
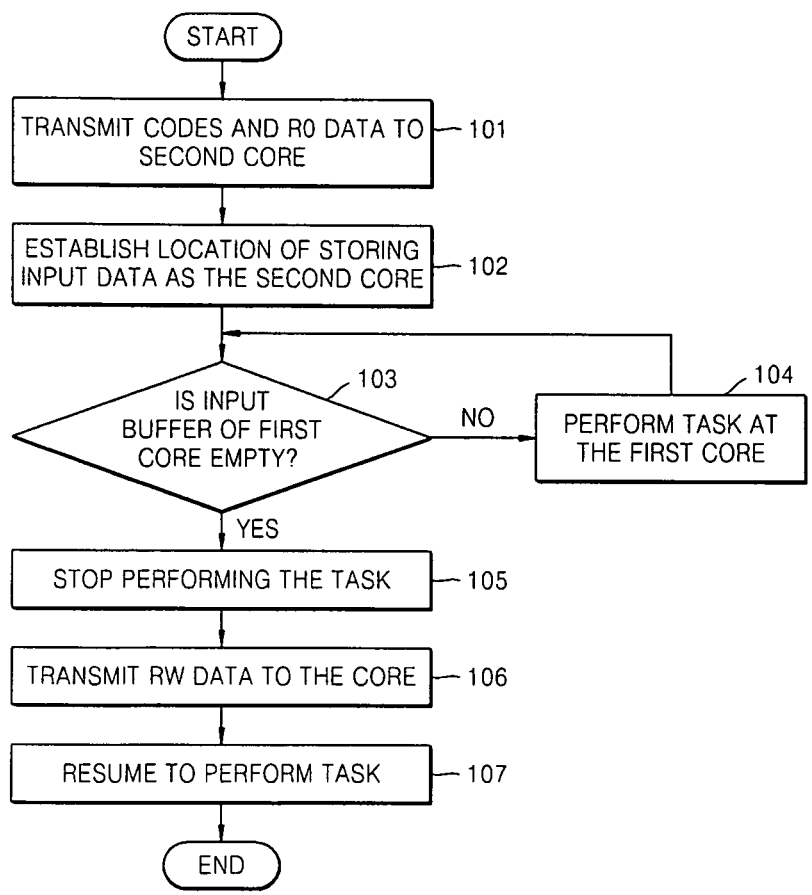
FIG. 13 is a flowchart illustrating a method of migrating a task in a multi-core system according to an embodiment of the present invention.

FIG. 13 is a flowchart illustrating a method of migrating a task in a multi-core system according to an embodiment of the present invention. Referring to FIG. 13, the method comprises operations that are time-serially processed in the multi-core/many-core platform shown in FIG. 1. Thus, although not described, the description regarding the multi-core/many-core platform may be applied to this method, according to embodiments of the present invention.

Referring to FIGS. 1 and 13, in operation 101, if migration of the task is determined, the first core 11 transmits codes and read only data of the task that is being performed in the first core 11 among the cores of the multi-core/many-core platform to the second core 21 among the cores of the multi-core/many-core platform. In operation 102, the first core 11 establishes a location of storing data that is to be input with regard to the task as an input buffer of the second SPM 22 connected to the second core 21. In operation 103, the first core 11 checks if an input buffer of the first SPM 11 connected to the first core 11 is empty. If the input buffer of the first SPM 11 is not empty, in operation 104, the first core 11 performs the task while operation 101 is performed.

If the input buffer of the first SPM 11 is empty, in operation 105, the first core 11 stops performing the task. In operation 106, the first core 11 transmits read write data of the task to the second core 21. In operation 107, the first core 11 resumes performing the task based on the codes, the read only data, and the read write data transmitted from the first core.

As described above, according to one or more embodiments of the present invention, a task dynamically migrates between cores in a multi-core/many-core platform, causing an overhead by migration of a memory. According to embodiments of the present invention, data migration between cores according to properties of data used by the task occurs at the same time as the task is performed, thus reducing the time when the task is stopped, so that the task is continuously performed. Furthermore, in spite of the migration of the task, the task may be continuously performed so that a core may be dynamically reallocated, thereby increasing utilization of each core by adjusting an allocation of tasks suitable for the load of a system or a combination of applications, building a multi-core system using limited cores, and reducing hardware costs.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded on a medium in a variety of ways, with examples of the medium including recording media, such as magnetic storage media (e.g., ROM, floppy disks, hard disks, etc.) and optical recording media (e.g., CD-ROMs, or DVDs). The computer readable code can also be transferred on transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Any narrowing or broadening of functionality or capability of an aspect in one embodiment should not considered as a respective broadening or narrowing of similar features in a different embodiment, i.e., descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of migrating a task in a multi-core platform including a plurality of cores, the method comprising:
    performing the task in a first core among the plurality of cores;
    transmitting codes of the task, not changed by performing the task, to a second core among the plurality of cores, the transmitting of the codes being performed while performing the task in the first core;
    determining whether performing the task in the first core is completed;
    transmitting the task, changed by performing the task, to the second core according to a result obtained by the determination; and
    resuming performing of the task in the second core based on the transmitted codes;
    wherein if the first core and second core are heterogeneous, transmitting codes of the tasks comprises the second core loading codes from memory and changing the codes to comply with an environment in which the codes are executed in the second core.

2. The method of claim 1, wherein the performing the task in the first core comprises:
processing data that is previously input with regard to the task based on the codes, and
wherein the resuming performing of the task in the second core comprises processing data that is to be input with regard to the task based on the transmitted codes.

3. The method of claim 1, further comprising stopping the performing the task in the first core if the data that is previously input with regard to the task is completely processed,
wherein the resuming performing of the task in the second core comprises resuming the stopped task.

4. The method of claim 3, wherein the data that is previously input with respect to the task is stored in an input buffer of a local memory connected to the first core, the method further comprising:
establishing a location for storing the data that is to be input with respect to the task as an input buffer of a local memory connected to the second core,
wherein the resuming performing of the task in the second core further comprises: processing data stored in the input buffer of the local memory connected to the second core.

5. The method of claim 4, wherein if the input buffer of the local memory connected to the first core is empty, the task is stopped in the first core.

6. The method of claim 1, wherein the transmitting of codes of the task comprises
transmitting codes and read only data of the task that is being performed in the first core to the second core, the method further comprising:
transmitting read write data of the task to the second core, if data that is previously input with regard to the task is completely processed,
wherein the resuming performing of the task in the second core comprises performing the task based on the transmitted codes, the read only data, and the read write data.

7. The method of claim 1, wherein the transmitting of codes of the task comprises:
determining a subject that processes the data that is to be input with respect to the task as the second core;
updating a task allocation table indicating each core that is allocated as the subject that processes each task according to the determining; and
transmitting the codes and read only data to the second core based on the updated task allocation table.

8. A non-transitory computer readable recording medium storing a program for causing a computer to execute the method of claim 1.

9. An apparatus for migrating a task in a multi-core platform including a plurality of cores, the apparatus comprising:
a first core transmitting codes of the task, not changed by performing the task, to a second core among the plurality of cores, the transmitting of the codes being performed while performing the task in the first core;
determining whether performing the task in the first core is completed;
transmitting the task, changed by performing the task, to the second core according to a result obtained by the determination; and
a second core performing the task based on the transmitted codes;
wherein if the first core and second core are heterogeneous, transmitting codes of the tasks comprises the second core loading codes from memory and changing the codes to comply with an environment in which the codes are executed in the second core.

10. The apparatus of claim 9, wherein the first core processes data that is previously input with regard to the task based on the codes and performs the task, and
the second core processes data that is to be input with regard to the task based on the transmitted codes and resumes performing of the task.

11. The apparatus of claim 9, wherein, if data that is previously input with regard to the task is completely processed, the first core stops performing the task in the first core, and
the second core resumes the stopped task.

12. The apparatus of claim 11, wherein the data that is previously input with respect to the task is stored in an input buffer of a local memory connected to the first core,
the first core establishes a location for storing the data that is to be input with respect to the task as an input buffer of a local memory connected to the second core, and
the second core processes data stored in the input buffer of the local memory connected to the second core and resumes performing of the stopped task.

13. The apparatus of claim 12, wherein, if the input buffer of the local memory connected to the first core is empty, the first core stops performing the task in the first core.

14. The apparatus of claim 9, wherein the first core transmits codes and read only data of the task that is being performed in the first core to the second core, and, if data that is previously input with regard to the task is completely processed, transmits read write data of the task to the second core,
the second core resumes performing the task based on the transmitted codes, the read only data, and the read write data.

15. The apparatus of claim 9, wherein the first core comprises:
a scheduler determining a subject that processes the data that is to be input with respect to the task as the second core;
a migration manager updating a task allocation table indicating each core that is allocated as the subject that processes each task according to the determining of the scheduler; and
a communication manager transmitting the codes to the second core based on the updated task allocation table.

* * * * *